United States Patent [19]

Wydra et al.

[11] Patent Number: 5,192,057
[45] Date of Patent: Mar. 9, 1993

[54] ELASTOMER REBOUND, JOUNCE AND RELATED COMPRESSION SPRINGS

[75] Inventors: Neal E. Wydra, Glen Ellyn; David W. Geick, North Aurora, both of Ill.

[73] Assignee: Miner Enterprises, Inc., Geneva, Ill.

[21] Appl. No.: 743,650

[22] Filed: Aug. 12, 1991

[51] Int. Cl.$^5$ .......................... F16F 1/52; F16F 13/00
[52] U.S. Cl. .................... 267/153; 267/122; 267/220; 267/293
[58] Field of Search ...................... 257/122, 220, 64.13, 257/64.19, 64.21, 64.23, 64.26, 64.27, 153, 35, 141, 141.1, 136, 293; 188/281, 284, 298, 322.22

[56] References Cited

U.S. PATENT DOCUMENTS

| | | | |
|---|---|---|---|
| 4,235,427 | 11/1980 | Bialobrzeski | 267/153 |
| 4,342,447 | 8/1982 | Marx | 267/122 |
| 4,711,463 | 12/1987 | Knable et al. | 267/220 |
| 4,756,516 | 7/1988 | Tondato | 267/220 |
| 4,844,486 | 7/1989 | Schieman | 277/212 EB |
| 4,883,288 | 11/1989 | Finn et al. | 280/672 |
| 4,890,822 | 1/1990 | Ezure | 267/64.27 |
| 4,934,730 | 1/1990 | Okuzumi | 280/668 |
| 4,962,916 | 10/1990 | Palinkas | 267/153 |
| 5,000,215 | 3/1991 | Phillips | 137/15 |
| 5,029,401 | 7/1991 | Masom | 267/122 |
| 5,098,071 | 3/1992 | Umetsu | 267/122 |

Primary Examiner—Matthew C. Graham

[57] ABSTRACT

A bellows shaped compression spring having a variable spring rate and formed of an elastomer having tensile characteristics such that the ratio of plastic strain to elastic strain is greater than 1.5 to 1, said spring being particularly adapted for use in the strut assemblies of light weight, low profile automobiles for minimizing noise, vibration and impact forces otherwise transmitted from the wheel to the vehicle-body.

13 Claims, 2 Drawing Sheets

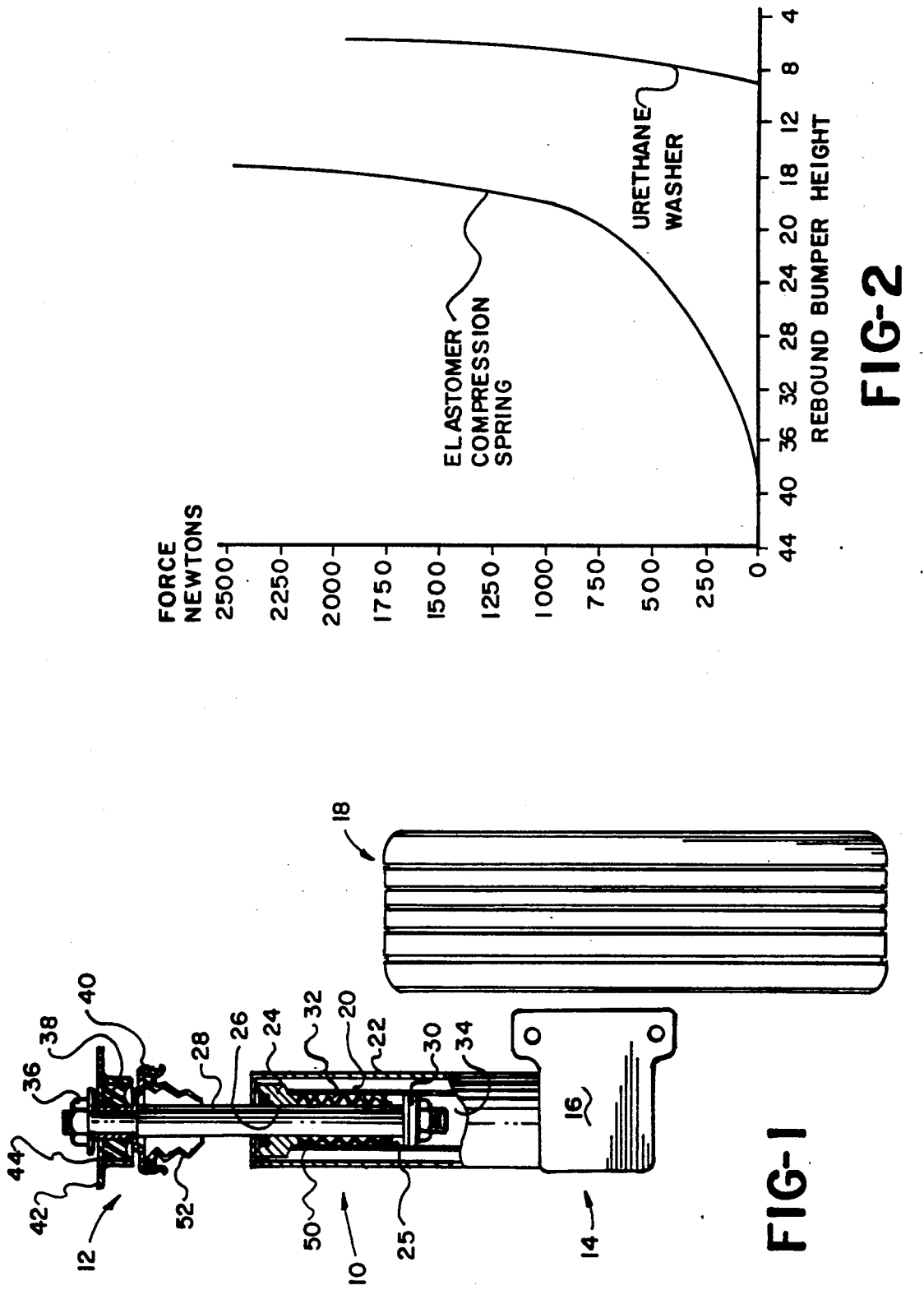

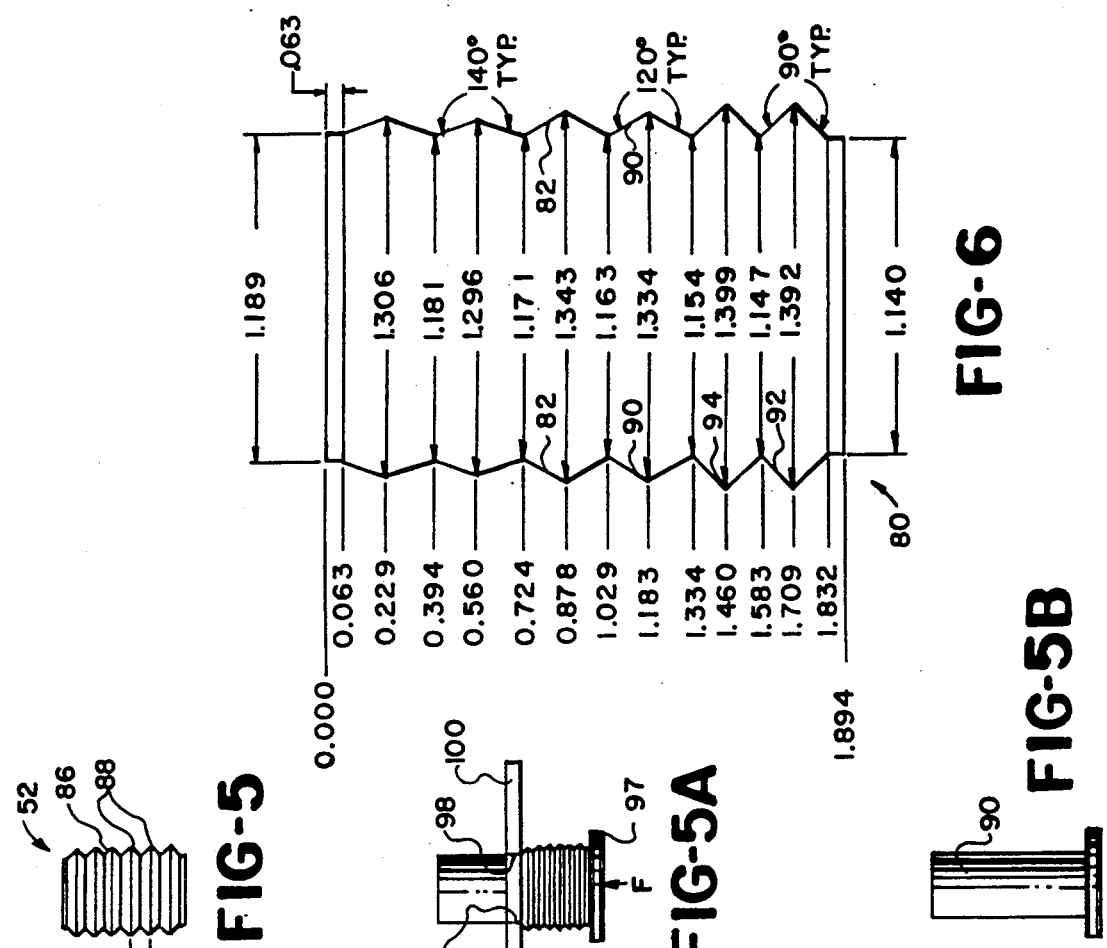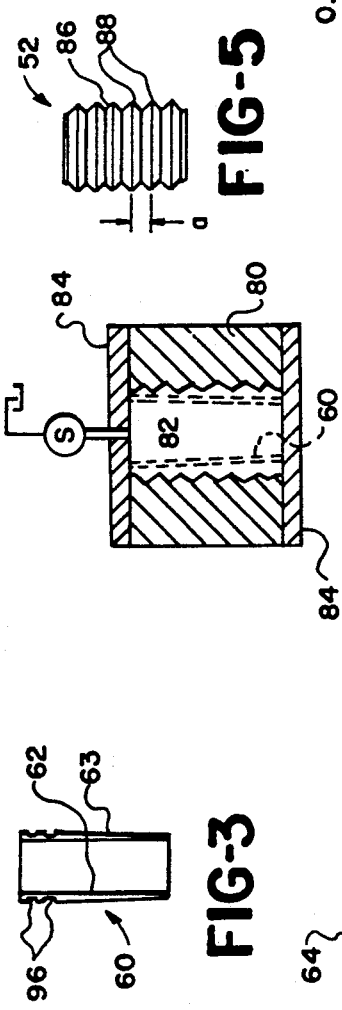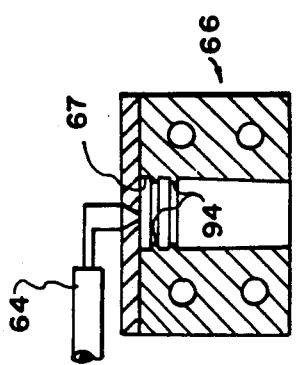

ELASTOMER REBOUND, JOUNCE AND RELATED COMPRESSION SPRINGS

BACKGROUND OF INVENTION

1. Field of Invention

This invention relates to the field of compression springs formed of elastomers. More specifically, the invention is primarily directed to compression spring improvements for use in the suspension systems of automobiles.

Since the early 1970's, automobile designs have focused on lighter weight and lower body lines. These designs necessitate suspension system modifications in at least two respects. First, the lower body line necessitates reduced suspension travel. Second, the lighter weight necessitates changes to very soft spring rates. These changes, in our view, require further design improvements in the jounce and rebound bumpers of the suspension strut assembly. In spite of years of design of these light weight, low profile automobiles, their suspension systems still transmit undesirable noise, vibration and road shock to the passengers. As a result, a major automobile manufacturer requested the design of several alternatives to its current rebound bumper and expressed a need for a spring with a soft entry and a longer travel. Consequently, this invention is primarily related to the problems of the strut assemblies of automobiles.

2. Related Art

Rebound bumpers for strut assemblies are conventionally formed of urethane elastomers. Their purpose is merely to soften and dampen the rebound impact when the strut of the suspension assembly is extended its maximum length as the wheel assembly drops into a depression relative to the vehicle body. Presently, such bumpers comprise small urethane washers surrounding the piston of the strut and have such a limited thickness as to cushion the vehicle only upon the last 2 to 3 millimeters of rebound. Moreover, they have a constant, high spring rate that does little to attenuate the noise, vibration or impact forces.

Present jounce bumpers for strut assemblies have undesirable characteristics similar to those of the rebound bumpers. Some improvement in these bumpers has been obtained through the use of micro-cellular urethane. In addition, U.S. Pat. No. 4,962,916, which issued to Uniroyal Chemical Co., Inc. on an application of Palinkus, suggested jounce bumpers formed of thermosetting and thermoplastic polyurethanes in which the bumpers have varying wall thicknesses in order to provide for a variable spring rate. This patent also mentions copolyesters such as Hytrel ®—but fails to address the compression set problem of such copolyesters or how this problem can be resolved with beneficial results. U.S. Pat. No. 4,235,427, which issued to Bialobrzeski, discloses the desirability of making springs of plastics such as acetal, polyethylene, polypropolene, tetrafluoroethylene, nylon and flexible PVC in which the characteristics of the spring is primarily determined by different radii of inner and outer convolutions whose resiliency is due to bending of the convolutions, not to the elastic deformation of the elastomeric material.

While unrelated to the present application, the prior art does include effective compression springs formed of copolymer elastomers such as Hytrel ®, an elastomer manufactured by E. I. du Pont de Nemoirs. Illustrative of this prior art are U.S. patents which issued to David G. Anderson. They include U.S. Pat. No. 4,198,037 entitled "Method of Making Polyester Elastomer Compression Spring and Resulting Product" and U.S. Pat. No. 4,566,678 entitled "Polymeric Apparatus and Method of Making the Same."

These patents of Mr. Anderson relate to compression springs that have a primary application in railroad car draft gears and other energy absorption devices. These applications involve a very high spring rate to absorb the impact forces generated by railroad cars weighing as much as 300,000 pounds. Such compression springs do not solve the problems faced by today's automobiles which demand a very soft ride in a light weight vehicle.

SUMMARY OF INVENTION

Our invention includes a compression spring designed for primary use in the strut of a suspension system for automobiles. It is an elongated hollow body formed of an elastomer whose ratio of plastic deformation to its elastic deformation is greater than 1.5 to 1. Preferably, the elastomer is a copolyester polymer elastomer such as that manufactured and sold by E. I. du Pont de Nemoirs under the trademark Hytrel ®.

The hollow body, preferably, takes the shape of an elongated bellows unit which may be placed over the piston rod of a strut. The bellows is formed of side walls and connecting sections whose dimensions vary along the length of the bellows so as to provide for a predetermined, variable spring rate.

Accordingly, the objectives of this invention are to provide, inter alia, 1) an improved strut assembly for a vehicle in which the rebound bumper is functionally integrated into the strut to assist in the elimination, damping and isolation of noise, vibration and road shock on the passengers of the vehicle;

2) an improved strut for an automobile assembly having a rebound bumper with a spring cushion travel in excess of 2 millimeters, and which provides for a soft entry and a variable spring rate to attenuate the noise, vibration or impact forces;

3) an improved strut for an automobile assembly having a jounce bumper providing a durable spring cushion travel in excess of 2 millimeters, a soft entry and a variable spring rate to attenuate the noise, vibration or impact forces;

4) an elastomer spring formed of an elastomer that is very durable, inert to reaction with automotive and strut assembly fluids, not subject to tear propagation, and that has tensile characteristics such that the ratio of plastic strain to elastic strain is greater than 1.5 to 1;

5) an elastomer spring in the form of a hollow bellows having wall sections and connecting sections of varying thicknesses, diameters, lengths and angles to obtain a variable spring rate tailored to fit various applications;

6) a low cost, efficient and effective elastomer spring and method of manufacture; and 7) a method of manufacturing a elastomer spring than can be tailored to provide a variable spring rate for various applications.

DESCRIPTION OF THE DRAWINGS

The manner in which these objectives and other desirable characteristics can be obtained is explained in the following specification and attached drawings in which:

FIG. 1 is an illustrative side elevation view, with portions broken away, of a automotive strut assembly adapted to be interconnected between a vehicle body and its associated wheel and tire incorporating the disclosed invention;

FIG. 2 is an illustrative displacement graph comparing the force-displacement of a rebound bumper according to the instant invention with that of the current urethane washer used by General Motors in one of its vehicles;

FIG. 3 is a side elevation, cross section view of a elastomer parison used to manufacture the compression spring of our invention;

FIG. 3(a) is a side elevation, cross section view of a female die and associated extruder used in forming the parison of FIG. 3;

FIG. 3(b) is a side elevation view of a male die part used in forming the parison of FIG. 3;

FIG. 4 is a side elevation, cross section view of a blow mold die into which a heated parison is inserted and expanded against the walls of the mold to form a bellows shape;

FIG. 4(a) is a side elevation view of the bellows resulting from the blow mold operation of FIG. 4;

FIG. 5 is a side elevation view of a finished spring which has been subjected to an irreversible plastic deformation;

FIG. 5(a) is a side elevation view of a pressure plate and male die used in the process of subjecting the bellows of FIG. 4(a) to an irreversible plastic deformation;

FIG. 5(b) is a side elevation view of the male die used in the process of FIG. 5(a); and FIG. 6 is an enlarged side elevation view of the inside dimensions of the blow mold of FIG. 4.

DESCRIPTION OF THE PREFERRED EMBODIMENT

The preferred embodiment of out invention is illustrated in one intended environment in FIG. 1. It depicts an automotive strut assembly 10 whose top end 12 is adapted for attachment to a vehicle body (not shown) and whose lower end 14 includes a mounting plate 16 adapted for connection (not shown) to an associated wheel and tire assembly 18. Affixed to and extending upward from the mounting plate 16 are inner and outer cylinders 20 and 22. Interposed between the top of these cylinders 20 and 22 is an annular cup 24 which has a central aperture 26 to receive, seal and provide a bearing surface. Extending through this aperture 26 is a piston rod 28 which carries a piston 30 at its lower end. The piston 30 may include metering orifices (not shown) to restrict the flow of fluid between upper and lower chambers 32 and 34 defined by the inner cylinder 20 and the piston 30. The top end 12 of the strut assembly includes a piston mounting nut 36 which clamps a spacer 38 and a downward opening retaining cup 40 on a reduced diameter of the piston rod 28. Surrounding the spacer 38 is an annular mounting cup 42 filled with an elastomer 44. This cup 42 is affixed to the vehicle body (not shown). Often, the coil spring of the suspension system is mounted around this strut assembly.

This conventional strut assembly 10 receives and benefits from our invention which is incorporated as a rebound bumper 50 into the upper chamber 32 between the annular cup 24 and an annular abutment 25 that is affixed to the piston rod 28. Our invention is also incorporated into the strut assembly 10 as a jounce bumper 52 by insertion into the retaining cup 40 to extend downward and cushion upward movement of the strut assembly 10. These compression spring bumpers 50 and 52 have the purpose of attenuating the noise, vibration and impact forces through soft entry, long travel and a variable spring rate. In particular, the use of our compression spring as a rebound bumper provides measurable ride improvements over the existing urethane washers used for this purpose. In part, the improvement is illustrated in FIG. 2 which provides an illustrative comparison of the compression characteristics of our invention relative to the urethane washers.

The curve on the right illustrates the characteristics of an existing rebound bumper for a General Motors W-car. It is a urethane washer and has a total travel of approximately 2 millimeters in response to an applied static forces varying from 0 to 1900 Newtons. The very short rebound travel and the high rebound force that occurs when the strut 10 is fully extended by a road surface condition results in the transmission of an impact like force to the body of the vehicle. Such rebound bumpers, transmit, rather than isolate the noise, vibration and impact forces from a road surface depression to the vehicle and its load.

In contrast to the urethane washer bumper, our invention can provide rebound travel in excess of 20 millimeters. As reflected by the left curve of FIG. 2, our rebound bumper 50 is normally extended to a bumper spring height of some 40 millimeters. When certain road conditions are encountered, the rebound bumper is engaged by a downward movement of the cylinders 20 and 22 relative to the piston 30. Due to the variable spring rate of our invention, the initial engagement of the rebound bumper 50 is very soft. As relative downward movement continues, the spring rate increases and the resilient force of the bumper spring opposes further movement at an increasing spring rate over a permitted compression of the spring of more than 20 millimeters. The result is elimination of transmission of most, if not all, of the noise, vibration and impact forces which are imposed on the strut assembly during rebound. Significantly, the soft entry of the piston into the rebound bumper and its long travel also contributes to a very smooth ride.

The jounce bumper 52 of our invention has compression spring characteristics similar to those of the curve of the rebound bumper graphically illustrated in FIG. 2. Similarly, it is also provided with a variable spring rate and provides for a soft entry and a substantial cushioning travel.

The compression spring according to our invention is formed of an elastomer having tensile characteristics such that the ratio of plastic strain is greater than 1.5 to 1. One such elastomer is a copolyester polymer elastomer manufactured and sold by E. I. du Pont de Nemoirs under the trademark Hytrel ®. It is reasonably inert to fluid in the strut assembly, and significantly, it is quite durable. Moreover, this elastomer is not subject to tearing or to crack propagation even when made in relatively thin cross sections as required by our invention. We prefer to use du Pont's Hytrel ® composition no. 5556. (For a more complete description of this elastomer, see Anderson U.S. Pat. No. 4,198,037).

Normally, the selected elastomer is purchased in pellet form, and, according to our invention, is injected or extruded into an annular mold to form a parison. As shown in FIG. 3, the parison 60 is cylindrical in shape and has a constant internal diameter 62 and a variable external diameter 63. As a result, its wall thickness varies, being thinner at one end and thicker at the other. The parison is formed of Hytrel ® which is heated and dispensed by an extruder or injecting molding machine 64 into a mold 66 which has an annular space 67 whose diameter varies. An annular male die member 68 of constant diameter is inserted centrally into the opening 67 of the mold 66 to define a cylindrical space for the parison 60. Illustrative dimensions of a die used in forming a parison for a strut assembly included an internal diameter of mold 66 that varied from 1.219 inches to 1.339 inches and an external diameter of the male die 68 that was 1.050 inches. These dimensions provide a parison having a variable wall thickness as shown in FIG. 3. Preferably, the mold 66 is made in two semi-cylindrical sections that may be held together by bolts, or alternatively, by a press in a conventional manner. After the molten Hytrel ® is extruded into this space to form the parison, and upon cooling and at least partial solidification of the Hytrel ®, the mold halves may be separated to strip the parison 60 from die member 68 for the subsequent step of blow forming or molding as reflected in FIGS. 4 and 4(a).

The blow mold 80 of FIG. 4 is also provided with a central cylindrical space 82 for receiving the parison 60. It is sealed at the top and bottom by plates 84, one of which is removable to permit insertion of the parison. The top plate 84 has an aperture for receiving fluid pressure from a source S which is applied to the inside of the parison 60 to expand it against the side walls of the cylindrical space 82. In accordance with our invention, the walls of the cylindrical space 82 takes the shape of a pleated surface as shown. Upon the application of pressure, the parison 60 is expanded radially to define a bellows unit with angular wall sections 86 and connecting sections 88 as shown in FIG. 4(a).

The blow mold 80 may be provided with apertures (not shown) to bleed air from the space between the side walls of the mold and the parison 60. The mold may also be provided with integral or separate induction or resistance heating elements to reheat the parison into a near molten state prior to blow molding. As those skilled in the art will appreciate, high volume production can also be accomplished by injecting the Hytrel ® into the mold 66 and onto the die member 68 and, prior to cooling, transferring the parison 60 on the die member 68 to a blow mold 80 without cooling. In this event, the die member 68 would also be provided with conduits for receiving and directing fluid pressure against the internal diameter of the parison 60.

The preferred embodiment of the internal surfaces 90 of our blow mold is depicted in more detail in FIG. 6 in which the actual dimensions for one blow mold 80 are given. Corresponding to the wall sections 86 and connecting sections 88 of the bellows, the mold surfaces include wall sections 92 and connecting sections 94. Near the top of the mold 80, its wall sections and the corresponding wall sections 86 of the bellows unit are longer than at the bottom of the mold and the bellows. Finally, the outside diameters of the surface angles near the top of the mold are greater than the outside diameters of the surface angles near the bottom of the mold so as to produce a bellows with larger diameters near the top. As a result of the dimensional differences such as those of the side wall thickness of the bellows, the lengths of the wall sections 86, the angles of the connecting sections 88, and the diameter of the bellows unit, the compression spring of our invention has a variable spring rate. Such provides for the soft entry into the rebound bumper with the spring rate increasing to minimize the possibility that the rebound bumper will bottom out.

After the parison has been blow molded into the bellows shape, the next step of forming our compression spring is to compress it beyond the elastic deformation point (from which it will recover) and into its plastic deformation (from which it will not recover). Such is believed to effect an orientation of the elastomer material and induce the bellows unit to take a compression set in which it has a reduced length as shown in FIG. 5. After the bellows has been plasticly deformed, it will nevertheless act as a spring upon compression to the extent of its elastic strain to which it will repeatedly recover and act as an effective compression spring.

The compression of our spring which eliminates a part of the plastic strain is accomplished as reflected in FIGS. 5(a and b). The bellows unit is removed from the blow mold 80 and is inserted onto another male die member 97. This die member is then inserted into an aperture 98 of a plate 100 and extended therethrough until the bellows is compressed to a solid position. Upon withdrawal of the die member 90, the bellows unit expands to the extent of its elasticity—taking a compression set to the extent of a part or all of its plastic strain.

In as much as various models of automobiles have different weights and different desired ride characteristics, there is no one manufacturing design for our compression springs which will accommodate all vehicle models and some experimentation for each potential application will be required. Nevertheless, a primary design criteria that is important to maintain is the ratio of the combined height of two adjoining wall sections 86 (denoted by the letter "a" in FIG. 5) to the thickness of the wall. This ratio should be less than 17. In making a compression spring according to our invention for a new application, the preferred, direct procedure is to make two or more springs, correlate their dimensions to their resulting spring rate and then interpolate or modify the dimensions until the desired spring rate is obtained.

Persons skilled in the art of plastic forming and compression spring design will discover that many modifications of our invention will produce satisfactory results. For example, we prefer to obtain a variable spring rate primarily by varying the wall thickness, and the section lengths of the bellows unit. Those skilled in the art will find that variations in the diameter and the angles of the bellows will also be effective to change the spring rate. Additionally, and as shown in FIG. 3, groves 96 may be formed in the thicker wall sections of the parison to improve the compression characteristics of the spring. Such groves may be formed by the use of lands 94 in mold 66. Additionally, the side walls of the bellows and their connecting angles can take various shapes and radii. Yet, we prefer very small radii which may, in all practical respects, constitute an apex. Other modifications which may improve the functioning of the spring include a snug fit between the internal diameter of the spring and the piston rod 28 and relatively thick flanges extending radially form the top and bottom wall sections. Importantly, persons skilled in the art of elastomers will find that elastomers other than Hytrel ® may be acceptable for some applications. With respect to the design of the bellows, such may also incorporate apertures in the wall sections to avoid capture of fluid therein, or alternatively, to act as a metering device.

The process of molding the compression spring of our invention can also include various modifications. For example, the compression spring may be directly formed in a mold without first forming the parison of FIG. 2. Similarly, extrusion blow molding and rotational molding would yield acceptable springs. These and other variations which will be appreciated by those skilled in the art within the intended scope of our invention as claimed below.

We claim:

1. In an vehicle strut assembly having a housing, a piston and piston rod extending through said housing and interconnecting the vehicle body to the wheel assembly for damping the vehicle spring system, an improved rebound bumper compression spring comprising:
   a) an elongated member formed of an elastomer having a ratio of plastic strain to elastic strain that is greater than 1.5 to 1, said member being mounted in said strut assembly so as to attenuate noise, vibration and road shocks;
   b) said member having wall sections and connecting angles to define a bellows shape;
   c) the molecular structure of the walls and angles of said member being oriented as a result of plastic deformation of said member in at least one direction;
   d) the dimensions of said member being such that the ratio of the combined height of two adjoining wall sections to the thickness of the wall is less than 17;
   e) the thickness of said walls increasing over a substantial portion of the length of the elongated member in order to provide a variable spring rate; and
   f) said member having a length so as to cushion said spring system upon rebound for a distance of greater than 3 millimeters and to provide for an initial soft spring rate for a portion of its travel and a higher spring rate for the remainder of its travel.

2. A rebound bumper spring as recited in claim 1 in which said bellows unit is deformed by precompression by more than 30% of its length in order to induce a compression set to which the spring will thereafter spring back in operation.

3. A compression spring as defined in claim 1 in which said member is cylindrical in shape.

4. In a vehicle strut assembly having a housing, a piston and piston rod extending through said housing and interconnecting the vehicle body to the wheel assembly for damping the vehicle spring system, an improved rebound bumper compression spring comprising:
   a) an elongated member formed of an elastomer having a ratio of plastic strain to elastic strain that is greater than 1.5 to 1, said member having wall sections joined by connecting angles that define substantially an apex;
   b) the molecular structure of the member being oriented as a result of some plastic deformation of said member in at least one direction;
   c) the dimensions of said member being such that the ratio of the combined height of two adjoining wall sections to the thickness of the wall does not exceed 17; (and)
   d) said member having a length so as to cushion said spring system upon rebound for a distance of greater than 3 millimeters and to provide for an initial soft spring rate for a portion of its travel and a higher spring rate for the remainder of its travel; and
   e) said member being mounting in said strut assembly surrounding said piston rod so as to attenuate noise, vibration and road shocks.

5. A compression spring as recited in claim 4 in which
   a) said member is formed of wall sections and connecting sections having an accordion-like cross sectional configuration;
   b) the dimensions of said member along at least a portion of its length being variable in order to provide a variable spring rate; and
   c) the molecular structure of the member being oriented as a result of some plastic deformation in its axial direction and in its radial direction.

6. A compression spring as defined in claim 4 in which the dimensions of the wall sections and the thickness of the wall sections are varied so as to provide a variable spring rate.

7. A compression spring as defined in claim 4 in which member is cylindrical and has a variable diameter in order to provide a variable spring rate.

8. A compression spring formed of an orientable thermoplastic elastomer comprising;
   a) an elongated member formed of an elastomer having a ratio of plastic strain to elastic strain that is greater than 1.5 to 1;
   b) said member having wall sections and connecting angles to define a bellows shape;
   c) the molecular structure of the walls and angles of said member being oriented as a result of plastic deformation of said member in at least one direction, said plastic deformation being substantially equal in all of the angles;
   d) the dimensions of said hollow member being such that the ratio of the combined height of two adjoining wall sections to the thickness of the wall is less than 17; and
   e) said connecting angles of said member progressively increasing from a minimum of 30° to a maximum of 160° to provide a variable spring rate.

9. A compression spring as defined in claim 8 in which said member is cylindrical.

10. A compression spring formed of an orientable thermoplastic elastomer comprising:
    a) an elongated member formed of an elastomer having a ratio of plastic strain to elastic strain that is greater than 1.5 to 1, said member being formed of a plurality of substantially straight wall sections joined by connecting sections having radii sufficiently small to approximate an apex;
    b) the molecular structure of the member being oriented as a result of some plastic deformation of said member in at least one direction;
    c) the dimensions of said member being such that the ratio of the combined height of two adjoining wall sections to the thickness of the wall does not exceed 17, and
    d) said connecting sections joining said wall sections at progressively increasing angles from a minimum of 30° to a maximum of 160° to provide for a variable, non-linear spring rate.

11. A compression spring as recited in claim 10 in which
    a) said member is formed of wall sections and connecting sections having an accordion-like cross sectional configuration;

b) the dimensions of said member along at least a portion of its length being variable in order to provide a variable spring rate; and
c) the molecular structure of the member being oriented as a result of some plastic deformation in its axial direction and in its radial direction.

12. A compression spring as defined in claim 10 in which the dimensions of the wall sections and the thickness of the wall sections are varied so as to provide a variable spring rate.

13. A compression spring as defined in claim 10 in which member is cylindrical and has a variable diameter in order to provide a variable spring rate.

* * * * *